United States Patent Office 3,708,471
Patented Jan. 2, 1973

3,708,471
S-ALKYL-(METHYLHEXAHYDRO-1H-AZEPINE)-
1-CARBOTHIOLATES
Wolfgang Rohr, Mannheim, Karl-Heinz Koenig, Frankenthal, and Adolf Fischer, Mutterstadt, Germany, assignors to Badische Anilin- & Soda-Fabrik Aktiengesellschaft, Ludwigshafen (Rhine), Germany
No Drawing. Filed Feb. 2, 1970, Ser. No. 8,038
Claims priority, application Germany, Feb. 7, 1969,
P 19 06 050.5
Int. Cl. A01n 9/12; C07d 41/04
U.S. Cl. 260—239 BF     4 Claims

ABSTRACT OF THE DISCLOSURE

S-alkyl-(methylhexahydro - 1H - azepine)-1-carbothiolates having the formula

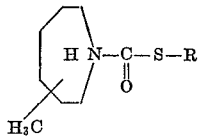

where R denotes an aliphatic radical which may bear one or more halogen atoms or hydroxyl groups as substituents or an araliphatic radical, these compounds being of value for controlling the growth of unwanted plants among useful crop plants.

---

It is known to use S-ethylhexahydro-1H-azepine-1-carbothiolate for controlling unwanted plants in crop plants such as barley, wheat and rice; however, its action is unsatisfactory.

We have now found that S-alkyl-(methylhexahydro-1H-azepine)-1-carbothiolates having the formula

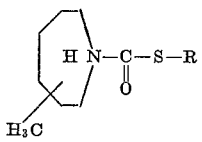

where R denotes an aliphatic radical (methyl, ethyl, propyl, isopropyl, butyl, sec-butyl, tert-butyl, pentyl, hexyl, allyl,, propargyl, butynyl, isobutynyl, β-hydroxyethyl, 3,3-dichloroallyl, 2,3-dichloroallyl, 2,3,3-trichloroallyl) which may bear one or more halogen atoms or hydroxyl groups as substituents or R denotes an araliphatic radical (benzyl), have a good herbicidal action. Compared with S-ethylhexahydro-1H-azepine-1-carbothiolate, their herbicidal action is sometimes the same and often better, and their compatibility with crop plants is superior.

The active ingredients may be prepared for example by reacting a suitable thiol ester of chloroformic acid with a methylhexahydro-1H-azepine. The new active ingredients may also be obtained by allowing methylhexahydro-1H-azepines in the form of the corresponding N-carbonic acid chlorides to react with suitable mercaptans.

Methylhexahydro-1H-azepines are accessible for instance through reduction of the corresponding methylcaprolactams (J. Amer. Chem. Soc., 76, 2317 (1954)).

The following methylhexahydro-1H-azepines are, for example, suitable for the production of the active ingredients:

2-methylhexahydro-1H-azepine;
3-methylhexahydro-1H-azepine;
4-methylhexahydro-1H-azepine.

Mixtures which contain different amounts of the three structural-isomeric methylhexahydro-1H-azepines are also suitable. Thus a methylhexahydro-1H-azepine isomer mixture is for example suitable which is obtained by reduction of an isomer mixture of methylcaprolactam which has been obtained by photooximation of methylcyclohexane and subsequent Beckmann rearrangement.

Production of S-n-propyl-(3-methylhexahydro-
1H-azepin)-1-carbothiolate

At 20° C., 14 parts by weight of thio-n-propyl chloroformate is added dropwise to a solution of 11.3 parts by weight of 3-methylhexahydro-1H-azepine, 10.5 parts by weight of triethylamine and 175 parts by weight of benzene. After one hour, the triethylammonium chloride is separated off; the filtrate is washed with water, dried with magnesium sulfate and then concentrated in vacuo. After distillation of the residue, the substance is obtained as a colorless liquid; boiling point (0.3 mm.): 107°–108° C.; $n_D^{25}=1.5071$.

The compound has the following structural formula:

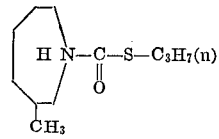

The following compounds may also be prepared by the same process:

S-ethyl-(2-methylhexahydro-1H-azepine)-1-carbothiolate,
  B.P. (2.5 mm.)=124° C., $n_D^{25}=1.5102$;
S-ethyl-(3-methylhexahydro-1H-azepine)-1-carbothiolate,
  B.P. (0.4 mm.)=104°–105° C., $n_D^{25}=1.5108$;
S-ethyl-(4-methylhexahydro-1H-azepine)-1-carbothiolate,
  B.P. (0.4 mm.)=102° C., $n_D^{25}=1.5110$;
S-isopropyl-(3-methylhexahydro-1H-azepine)-1-carbothiolate, B.P. (0.35 mm.)=94° C., $n_D^{25}=1.5046$;
S-isopropyl(4-methylhexahydro-1H-azepine)-1-carbothiolate, B.P. (0.15 mm.)=94°–98° C., $n_D^{25}=1.5050$.

The S-alkyl-(methylhexahydro - 1H - azepine)-1-carbothiolates are also obtained as isomer mixtures when methylhexahydro-1H-azepine as an isomer mixture is reacted with chloroformic acid thiol esters in accordance with the process described above.

The following compounds are examples of mixtures of different 2-, 3- and 4-methyl structural isomers:

S-methyl-(methylhexahydro-1H-azepine)-1-carbothiolate,
  B.P. (0.4 mm.)=99°–102° C., $n_D^{25}=1.5170$;
S-ethyl-(methylhexahydro-1H-azepine)-1-carbothiolate,
  B.P. (0.38 mm.)=103°–105° C., $n_D^{25}=1.5104$;
S-n-propyl-(methylhexahydro-1H-azepine)-1-carbothiolate, B.P. (0.5 mm.)=117°–122° C., $n_D^{25}=1.5071$;
S-isopropyl-(methylhexahydro-1H-azepine)-1-carbothiolate, B.P. (0.15 mm.)=86°–92° C., $n_D^{25}=1.5051$;
S-benzyl-(methylhexahydro-1H-azepine)-1-carbothiolate,
  B.P. (0.45 mm.)=159–164° C., $n_D^{25}=1.5648$.

The agents according to the invention may be used as solutions, emulsions, suspensions or dusts. The forms of application depends entirely on the purpose for which the agents are being used; in any case it should ensure a fine distribution of the active ingredient.

For the preparation of solutions to be sprayed direct, the solution in water is suitable. However, hydrocarbons having boiling points higher than 150° C., e.g. tetrahydronaphthalene or alkylated naphthalenes, or organic liquids having boiling points higher than 150° C., and having one or more than one functional group, e.g. the keto group, the ether group, the ester group or the amide group, this group or these groups being attached as substituent(s) to a hydrocarbon chain or being a component of a heterocyclic ring, may also be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. kieselguhr, talc, clay or fertilizers. It is also possible to add insecticides, fungicides, bactericides and other herbicidal agents.

The following comparative experiments demonstrate the application of the new active ingredients.

EXAMPLE 1

Sandy soil is filled into pots and sown with the seeds of cabbage species (Brassica sp.), barley (*Hordeum vulgare*), wheat (*Triticum sativum*), rice (*Oryza sativa*), all of which are useful crop plants, the same pots also being sown with seeds of the following weed plants: large crabgrass (*Digitaria sanguinalis*), green foxtail (*Setaria viridis*), barnyard grass (*Echinochloa crus-galli*), wild oats (*Avena fatua*), annual meadow grass (*Poa annua*), perennial rye gass (*Lolium perenne*), slender foxtail (*Alopecurus myosuroides*), orchardgrass (*Dactylis glomerata*) and sedge species (*Cyperus sp.*). The soil prepared in this manner is then immediately treated with 3 kg. per hectare of an isomer mixture of S-propyl-(methylhexahydro-1H-azepine) - 1 - carbothiolate (I), with 3 kg. per hectare of an isomer mixture of S-isopropyl-(methylhexahydro - 1H - azepine) - 1 - carbothiolate (II), with 3 kg. per hectare of an isomer mixture of S-ethyl-(methylhexahydro-1H-azepine)-1-carbothiolate (III) and, for comparison, with 3 kg. per hectare of S-ethylhexahydro-1H-azepine-1-carbothiolate (IV), these amounts of the active ingredients each being dispersed in 500 liters of water per hectare.

The results of the experiment after five weeks are given in the following table:

|  | Active ingredient | | | |
|---|---|---|---|---|
|  | I | II | III | IV |
| Crop Plants: |  |  |  |  |
| Brassica sp. | 0–10 | 0–10 | 0–10 | 50 |
| Hordeum vulgare | 10 | 10 | 10 | 20 |
| Triticum vulgare | 10 | 10 | 10 | 20 |
| Oryza sativa | 0–10 | 0–10 | 0–10 | 10–20 |
| Weed Plants: |  |  |  |  |
| Digitaria sanguinalis | 100 | 100 | 100 | 90–100 |
| Setaria viridis | 100 | 100 | 100 | 80 |
| Echinochloa crus-galli | 100 | 100 | 100 | 90 |
| Avena fatua | 100 | 90 | 90–100 | 40–50 |
| Poa annua | 90–100 | 90 | 90–100 | 70 |
| Lolium perenne | 90–100 | 80–90 | 90–100 | 60–70 |
| Alopecurus myosuroides | 90–100 | 80–90 | 90–100 | 60–70 |
| Apera spica venti | 90–100 | 90 | 90–100 | 70 |
| Dactylis glomerata | 90–100 | 90 | 90–100 | 70 |
| Cyperus sp. | 100 | 80–90 | 70 | 70 |

NOTE.—0=No damage; 100=Total destruction.

EXAMPLE 2

The plants cabbage species (Brassica sp.), wild oats (*Avena fatua*), annual meadow grass (*Poa annua*), perennial rye grass (*Lotium perenne*), silky bent grass (*Apera spica venti*), barnyard grass (*Echinochloa crus-galli*), large crabgrass (*Digitaria sanguinalis*) and sedge species (*Cyperus sp.*) are treated at a growth height of 3–15 cm. with 4 kg. per hectare of an isomer mixture of S-propyl-(methylhexahydro - 1H - azepine) - 1 - carbothiolate (I), with 4 kg. per hectare of an isomer mixture of S-isopropyl-(methylhexahydro-1H-azepine) - 1 - carbothiolate (II), with 4 kg. per hectare of an isomer mixture of S-ethyl-(methylhexahydro-1H-azepine) - 1 - carbothiolate (III) and, for comparison, with 4 kg. per hectare of S-ethylhexahydro - 1H - azepine - 1 - carbothiolate (IV), these amounts of the active ingredients each being dispersed in 500 liters of water per hectare. The results of the experiment after four weeks are given in the following table:

|  | Active ingredient | | | |
|---|---|---|---|---|
|  | I | II | III | IV |
| Crop plant; Brassica sp. | 0–10 | 0–10 | 10 | 40 |
| Weed Plants: |  |  |  |  |
| Avena fatua | 60 | 60 | 70 | 40–50 |
| Poa annua | 90–100 | 80 | 90–100 | 50 |
| Lolium perenne | 80–90 | 70 | 80–90 | 40 |
| Apera spica venti | 90 | 70–80 | 90 | 40–50 |
| Echinochloa crus-galli | 70 | 60 | 60 | 50 |
| Digitaria sanguinalis | 70–80 | 60 | 60 | 50 |
| Cyperus sp. | 70 | 60 | 50–60 | 20 |

NOTE.—0=No damage; 100=Total destruction.

The action of the following active ingredients corresponds to that of compounds I, II and III in Examples 1 and 2:

S-ethyl-(2-methylhexahydro-1H-azepine)-1-carbothiolate;
S-ethyl-(3-methylhexahydro-1H-azepine)-1-carbothiolate;
S-ethyl-(4-methylhexahydro-1H-azepine)-1-carbothiolate;
S-propyl-(3-methylhexahydro-1H-azepine)-1-carbothiolate;
S-isopropyl-(4-methylhexahydro-1H-azepine)-1-carbothiolate;
S-isopropyl-(3-methylhexahydro-1H-azepine)-1-carbothiolate;

and isomer mixtures of

S-methyl-(methylhexahydro-1H-azepine)-1-carbothiolate;
S-benzyl-(methylhexahydro-1H-azepine)-1-carbothiolate;

EXAMPLE 3

60 parts by weight of compound I from Example 1 is mixed with 40 parts by weight of N-methyl-α-pyrrolidone. A mixture is obtained which is suitable for application in the form of very fine drops.

EXAMPLE 4

20 parts by weight of compound II from Example 1 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 5

20 parts by weight of compound III from Example 1 is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredients.

EXAMPLE 6

20 parts by weight of compound I from Example 1 is well mixed with 3 parts by weight of the sodium salt of diisobutylnaphthalene-α-sulfonic acid, 17 parts by weight of the sodium salt of a ligninsulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1% by weight of the active ingredient.

EXAMPLE 7

3 parts by weight of compound I from Example 1 is intimately mixed with 97 parts by weight of particulate kaolin. A dust is obtained containing 3% by weight of the active ingredient.

EXAMPLE 8

30 parts by weight of compound I from Example 1 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:
1. S-propyl-(methylhexahydro - 1H - azepine)-1-carbothiolate.
2. S-isopropyl-(methylhexahydro - 1H - azepine) - 1-carbothiolate.
3. S-ethyl - (methylhexahydro - 1H - azepine)-1-carbothiolate.
4. S-benzyl-(methylhexahydro - 1H - azepine)-1-carbothiolate.

References Cited

UNITED STATES PATENTS

| | | | |
|---|---|---|---|
| 3,198,786 | 8/1965 | Tilles et al. | 260—239 |
| 3,066,020 | 11/1962 | Tilles et al. | 71—94 |
| 3,297,680 | 1/1967 | Hamm et al. | 71—88 |
| 3,357,815 | 12/1967 | D'Amico | 260—239 |
| 3,288,782 | 11/1966 | D'Amico | 260—239 |
| 3,303,014 | 2/1967 | D'Amico | 260—239 |

ALTON D. ROLLINS, Primary Examiner

U.S. Cl. X.R.

71—88